Figure 1:
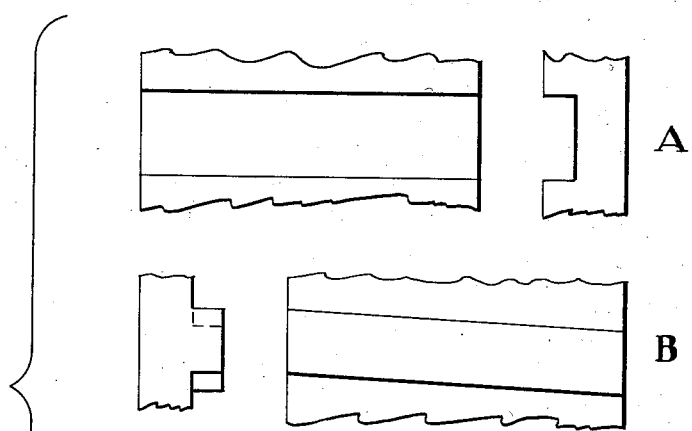

May 5, 1931.  R. CHILTON  1,803,995
SPLINED CONNECTION
Filed May 15, 1930

INVENTOR.
ROLAND CHILTON
BY
ATTORNEY

Patented May 5, 1931

1,803,995

UNITED STATES PATENT OFFICE

ROLAND CHILTON, OF RIDGEWOOD, NEW JERSEY, ASSIGNOR TO WRIGHT AERONAUTICAL CORPORATION, A CORPORATION OF NEW YORK

SPLINED CONNECTION

Application filed May 15, 1930. Serial No. 452,597.

My invention relates to an improvement in splined fittings, or connections in which a shaft having splines, carries, in a fixed relation, the corresponding internally splined hub of a gear wheel, airplane propeller or other driven or driving mechanism. It is especially adapted to cases where the shaft or hub is alternately the driving and driven member, or, where there is a reversal of torque.

Splined connections, consisting of the usual male and female members, used as a means of detachably, but firmly, securing the members against relative rotation, are primarily dependent for their successful operation on the accuracy of the fit between the sides of the splines and their corresponding grooves. Commercial limits of accuracy of manufacture, and diversity of methods, necessarily introduce difficulties in maintaining the necessary closeness of fit between the members.

It has been found that if the clearances are made sufficiently great to permit practicable assembly, then only a few of the splines will be doing the work and very often even these will have contact over only a part of their length, on the other hand if a tight fit is attempted, the parts cannot be assembled. Another difficulty is due to torsional deflections of the shafts under load which produces a slight but measurable helical distortion particularly where the direction of torque is frequently reversed. In this case all the driving load is concentrated at the end of the fit at which the driving torque is applied to the shaft.

The principal object of this invention is to so construct the members of a splined connection that sufficient clearance between the splines and grooves can be given to enable practicable assembly or disassembly, yet, when the parts are so assembled, there will be no rotational play or clearance between the splines and grooves even when the maximum working torque is applied in either direction. Other objects and advantages will appear from the description and claims.

I accomplish the objects of this invention by constructing the splines of one member with a slight helix angle, the splines of the other member being straight and parallel to the shaft axis as usual. With this construction it will be seen (Fig. 1—C) that, when the members are forced together in assembly, they will contact with predetermined pressure at the forward side of the splines towards one end, and at the rearward side towards the other end, thus utilizing the natural torsional elasticity of the shaft to compensate for inaccuracies of fabrication. Further, for example, knowing the torsional resistance of the shaft member and the working torque to be transmitted, the helix angle can be so selected that the torsional force set up by assembly is greater, by a suitable amount, than the working torque.

In this case the side surfaces of the splines and grooves are in firm driving contact under all working conditions and the development of looseness is prevented.

Figure 2:
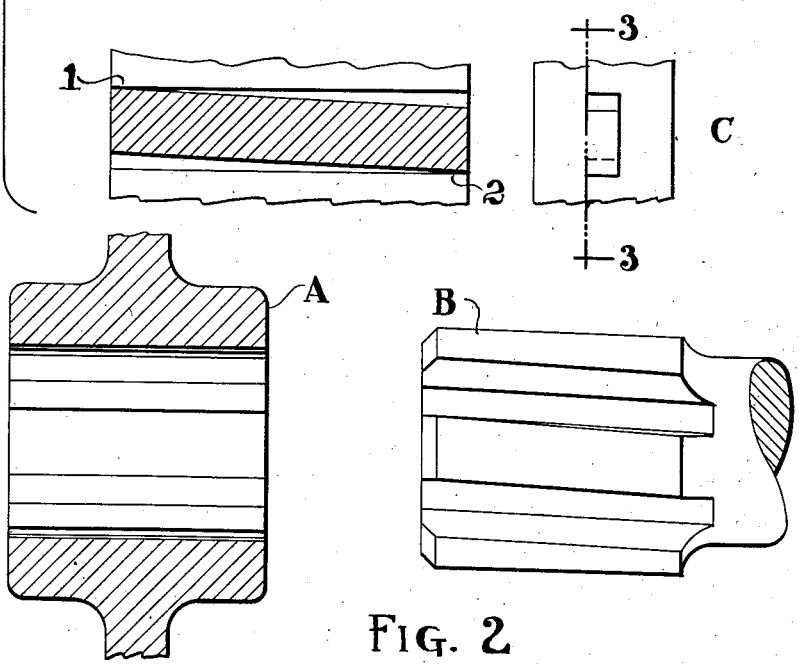

The construction is shown in the drawings in which Fig. 1—B is a diagrammatic view of one spline, A its groove, and C the assembly in section on the line 3—3. Fig. 2 shows a spline shaft and its hub before assembly. The splines and grooves being shown square and the helix angles of the splines being much exaggerated, for clearness. Similar parts are indicated by similar numerals.

It is obvious that when, as in Fig. 1, the deformable helical spline B is forced into the relatively rigid straight groove A that the material of B will be stressed and deformed and that the points of highest contact pressure will be at 1 and 2 in Fig. 1—C.

The initial load at 1 or 2 in any assembly, is made greater than the working torque load but within the elastic limit of the material.

Under these conditions the points 1 and 2 will always be in firm contact and looseness and wear will be prevented.

I have shown the spline as the deformable member but obviously the groove, or, both the spline and the groove, could be made the deformable member or members without departing from the basic principle of the invention.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a splined connection; a driven member; a driving member; one said member having formed therein a groove, the side walls of which are substantially parallel; and a spline on the other said member adapted for fitting engagement within said groove, said spline having substantially parallel side walls which are not, however, in parallelism with the side walls of said groove.

2. In a splined connection; a driven member; a driving member; one said member having formed therein a groove; and a spline on the other said member narrower than said groove and bearing on the walls of said groove at the opposite ends of and at the opposite sides of said spline only.

3. In a splined connection; a driven member; a driving member; one said member having formed therein a groove; and a spline on the other said member engaging within and having walls set at an angle to the corresponding walls of said groove.

4. In a splined connection; a driven member; a driving member; one said member having formed therein a groove; and a spline on the other said member, the corresponding spline and groove walls being divergent from the points of contact.

5. A splined connection comprising a driven member; a driving member; a spline on one of said members having substantially parallel sides; the other said member having a groove with parallel sides formed therein, the sides of the groove and the sides of the spline being non-parallel.

6. A splined connection comprising a driven member; a driving member; a spline on one said member; the other said member having a groove formed therein, the sides of the groove and the sides of the spline being non-parallel.

7. A splined connection comprising a shaft; a spline on said shaft having substantially parallel sides; a hub on said shaft having a groove formed therein for said spline; said groove having substantially parallel sides, but the sides of the groove diverging from the sides of the spline.

8. The method of securing a tight fit and of eliminating play between cooperating members of a driving connection which comprises forming grooves with parallel sides in one of said cooperating members, forming splines with parallel sides on the other member of said driving connection so that when assembled the sides of the groove diverge from the sides of the spline, deforming the members, and assembling the spline and the groove so that parts of the sides of the splines contact firmly with parts of the sides of the grooves.

9. In a spline connection between a shaft and a hub, the method of securing an initial rotational driving fit which comprises, forming the splines of one member to be slightly helical with respect to the splines on the other and then forcing the parts together whereby their torsional elasticity creates opposite driving contacts at opposite ends of the splines.

In testimony whereof I hereunto affix my signature.

ROLAND CHILTON.